(12) United States Patent
Lindner et al.

(10) Patent No.: US 10,620,316 B2
(45) Date of Patent: Apr. 14, 2020

(54) SYSTEMS AND METHODS FOR GENERATING A STRUCTURED LIGHT DEPTH MAP WITH A NON-UNIFORM CODEWORD PATTERN

(71) Applicant: QUALCOMM Incorporated, San Diego, CA (US)

(72) Inventors: Albrecht Johannes Lindner, La Jolla, CA (US); Kalin Mitkov Atanassov, San Diego, CA (US); James Wilson Nash, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 452 days.

(21) Appl. No.: 15/588,468

(22) Filed: May 5, 2017

(65) Prior Publication Data

US 2018/0321384 A1 Nov. 8, 2018

(51) Int. Cl.
*G01S 17/00* (2020.01)
*G01S 17/89* (2020.01)
(Continued)

(52) U.S. Cl.
CPC .......... *G01S 17/89* (2013.01); *G01S 7/4808* (2013.01); *G01S 7/4911* (2013.01); *G01S 17/42* (2013.01); *G06T 7/521* (2017.01)

(58) Field of Classification Search
USPC ...................................................... 356/4.01
See application file for complete search history.

(56) References Cited

U.S. PATENT DOCUMENTS 7,888,626 B2 * 2/2011 Slinger ............... G01T 1/295
250/216
9,694,498 B2 * 7/2017 Konolige ............. H04N 13/239
(Continued)

FOREIGN PATENT DOCUMENTS

WO WO-2016138143 A1 9/2016

OTHER PUBLICATIONS

Achar S., et al., "Multi Focus Structured Light for Recovering Scene Shape and Global Illumination" In: "Lecture Notes in Computer Science", Jan. 1, 2014 (Jan. 1, 2014), Springer Berlin Heidelberg, Berlin, Heidelberg, vol. 8689, XP055193120, pp. 205-219.
(Continued)

*Primary Examiner* — James R Hulka
(74) *Attorney, Agent, or Firm* — QUALCOMM Incorporated

(57) ABSTRACT

Systems, methods, and devices for generating a depth map of a scene are provided. The method comprises projecting, onto the scene, a codeword pattern including a plurality of light points including a first set of light points projected at a first intensity and a second set of light points projected at a second intensity greater than the first intensity. The method further comprises detecting, from the scene, a reflection of the codeword pattern. The method further comprises generating a first depth map layer at a first resolution. The method further comprises generating a second depth map layer at a second resolution lower than the first resolution. The method further comprises generating the depth map of the scene, wherein the depth map includes depth information for the scene according to each of the first depth map layer and the second depth map layer.

28 Claims, 10 Drawing Sheets

(51) Int. Cl.
  *G01S 7/4911* (2020.01)
  *G01S 7/48* (2006.01)
  *G01S 17/42* (2006.01)
  *G06T 7/521* (2017.01)

(56) References Cited

U.S. PATENT DOCUMENTS

| | | | |
|---|---|---|---|
| 9,846,943 B2* | 12/2017 | Nash | G06K 9/18 |
| 2009/0095912 A1 | 4/2009 | Slinger et al. | |
| 2012/0056982 A1 | 3/2012 | Katz et al. | |
| 2014/0132722 A1 | 5/2014 | Martinez et al. | |
| 2014/0346334 A1* | 11/2014 | Grossinger | G01S 17/46 |
| | | | 250/229 |
| 2015/0198716 A1* | 7/2015 | Romano | G01S 7/48 |
| | | | 356/614 |
| 2015/0381965 A1 | 12/2015 | Atanassov et al. | |
| 2015/0381972 A1 | 12/2015 | Kowdle et al. | |
| 2016/0179188 A1* | 6/2016 | Grossinger | G06F 3/017 |
| | | | 345/158 |
| 2016/0180574 A1* | 6/2016 | Kaminitz | G06T 11/60 |
| | | | 345/633 |
| 2016/0196657 A1* | 7/2016 | Kantor | G06K 9/00201 |
| | | | 382/154 |
| 2016/0253812 A1* | 9/2016 | Grossinger | G01B 11/14 |
| | | | 356/614 |
| 2016/0253821 A1* | 9/2016 | Romano | G06F 3/017 |
| | | | 382/103 |
| 2016/0274679 A1* | 9/2016 | Romano | G06F 3/0317 |
| 2016/0286202 A1* | 9/2016 | Romano | G01S 17/46 |
| 2016/0288330 A1 | 10/2016 | Konolige | |
| 2016/0335773 A1* | 11/2016 | Romano | G06T 15/50 |
| 2017/0061634 A1 | 3/2017 | Nash et al. | |
| 2018/0157342 A1* | 6/2018 | Romano | G06F 3/0325 |
| 2018/0324412 A1* | 11/2018 | Romano | G01S 17/46 |

OTHER PUBLICATIONS

International Search Report and Written Opinion—PCT/US2018/021568—ISA/EPO—May 16, 2018.
Van Der Jeught S. et al., "Real-Time Structured Light Profilometry: A Review," Optics and Lasers in Engineering, Elsevier, Amsterdam, NL, vol. 87, Feb. 11, 2016 (Feb. 11, 2016), XP029721400, pp. 18-31, ISSN: 0143-8166, DOI:10.1016/J.Optlaseng.2016.01.11.
Kirmani A., et al., "Exploiting Sparsity in Time-of-Flight Range Acquisition Using a Single Time-Resolved Sensor", OSA Publishing, Optics Express, vol. 19, No. 22, 2011, pp. 21485-21507.

* cited by examiner

SYSTEMS AND METHODS FOR GENERATING A STRUCTURED LIGHT DEPTH MAP WITH A NON-UNIFORM CODEWORD PATTERN

BACKGROUND

Field

This disclosure generally relates to systems and methods for light field projection, and more particularly to depth map generation.

Background

Structured light systems may transmit and receive codeword patterns onto a scene including one or more objects to generate a depth map. The further away an object is from the projector and receiver of the structured light system, the smaller the disparity between light points on the codeword pattern reflected by the object and original locations of the light points on the projected codeword pattern, as the outgoing projection and incoming projections are more parallel. Conversely, the closer an object is to the projector and receiver, the greater the disparity between the locations of the reflected codeword pattern light points and their original positions in the projected codeword pattern. Given this, structured light systems determine such disparities to generate relative depth information of the scene or object. Thereafter, structured light systems use the relative depth information to generate a depth map, or a three-dimensional representation, of the scene. Depth map extraction is useful for many applications ranging from camera quality enhancement to computer vision.

Generating depth maps can be computationally expensive. In general, as depth map quality (resolution) increases, structured light system power consumption increases. Furthermore, to increase depth map sensing distances (increasing depth), structured light system laser intensity requirements, and thus power requirements, also increase. Structured light system designers balance quality and depth levels with structured light system power requirements. Because computation time remains a major obstacle for commercialization of structured light systems that generate depth maps, and because desired depth values and quality levels for depth maps continue to increase, there exists a need for structured light systems enabling high levels for all of power efficiency, depth map resolution, and depth map distance.

SUMMARY

The systems, methods, and devices of the invention each have several aspects, no single one of which is solely responsible for its desirable attributes. Without limiting the scope of this invention as expressed by the claims which follow, some features will now be discussed briefly. After considering this discussion, and particularly after reading the section entitled "Detailed Description," one will understand how the features of this invention provide advantages that include improved generation of a structured light depth map with a codeword pattern. Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the present application provides a method for generating a depth map of a scene are provided. The method comprises projecting, onto the scene, a codeword pattern including a plurality of light points including a first set of light points projected at a first intensity and a second set of light points projected at a second intensity greater than the first intensity. The method further comprises detecting, from the scene, a reflection of the codeword pattern. The method further comprises generating a first depth map layer at a first resolution. The method further comprises generating a second depth map layer at a second resolution lower than the first resolution. The method further comprises generating the depth map of the scene, wherein the depth map includes depth information for the scene according to each of the first depth map layer and the second depth map layer.

Another aspect of the present application provides an apparatus generating a depth map of a scene. The apparatus comprises a projector configured to project, onto the scene, a codeword pattern including a plurality of light points including a first set of light points projected at a first intensity and a second set of light points projected at a second intensity greater than the first intensity. The apparatus further comprises a receiver configured to detect, from the scene, a reflection of the codeword pattern. The apparatus further comprises a processor configured to: generate a first depth map layer at a first resolution; generate a second depth map layer at a second resolution lower than the first resolution; and generate the depth map of the scene, wherein the depth map includes depth information for the scene according to each of the first depth map layer and the second depth map layer.

Another aspect of the present application provides an apparatus for generating a depth map of a scene. The apparatus comprises means for projecting, onto the scene, a codeword pattern including a plurality of light points including a first set of light points projected at a first intensity and a second set of light points projected at a second intensity greater than the first intensity. The apparatus further comprises means for detecting, from the scene, a reflection of the codeword pattern. The apparatus further comprises means for generating a first depth map layer at a first resolution, wherein the means for generating further generates a second depth map layer at a second resolution lower than the first resolution. In an aspect, the means for generating further generates the depth map of the scene, wherein the depth map includes depth information for the scene according to each of the first depth map layer and the second depth map layer.

Yet another aspect of the present application provides a non-transitory computer-readable medium comprising code that, when executed, causes a processor of an apparatus to project, onto a scene, a codeword pattern including a plurality of light points including a first set of light points projected at a first intensity and a second set of light points projected at a second intensity greater than the first intensity. The code, when executed, further causes the processor of the apparatus to detect, from the scene, a reflection of the codeword pattern; generate a first depth map layer at a first resolution. The code, when executed, further causes the processor of the apparatus to generate a second depth map layer at a second resolution lower than the first resolution. The code, when executed, further causes the processor of the apparatus to generate a depth map of the scene, wherein the depth map includes depth information for the scene according to each of the first depth map layer and the second depth map layer.

DETAILED DESCRIPTION

Figure 1:
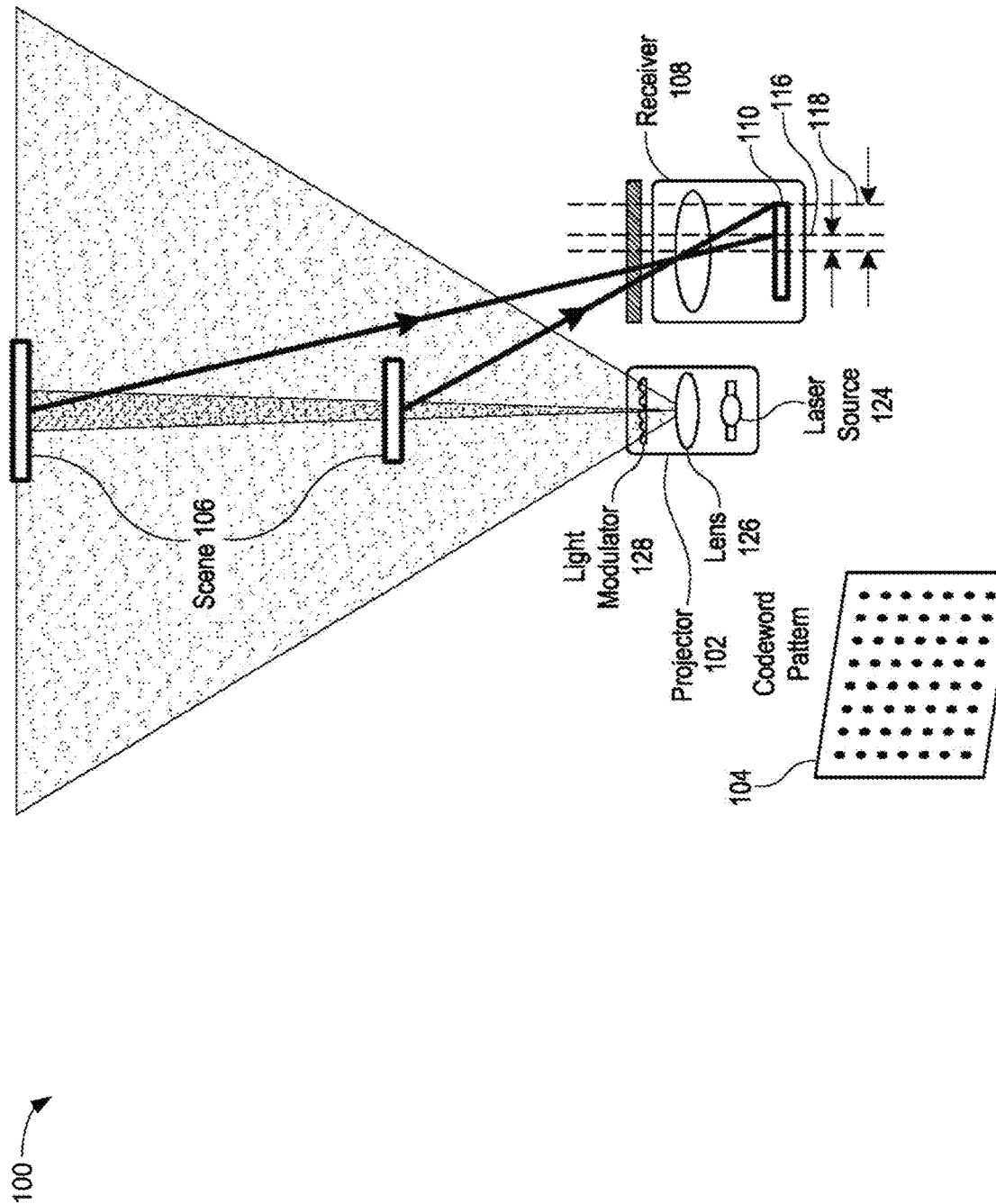
FIG. 1 illustrates an example of a structured light system in which aspects of the present disclosure can be employed.

Various aspects of the novel systems, apparatuses, methods, and mediums are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In general, the present disclosure relates to techniques for light field projection and analysis. More specifically, this disclosure relates to systems, methods, and devices for generating a depth map of a scene based on analysis of projections and reflections of a codeword pattern projected onto a scene and/or one or more objections in a scene. As described herein, generating a depth map may also be referred to as constructing, forming, creating, and/or calculating a depth map, or the like. A depth map may also be referred to herein as a structured light depth map. A scene can include one or more objects and/or object surfaces. Depth map generation of a scene or of one or more objects in the scene may be useful for many applications, e.g., camera quality enhancement, computer vision, obstacle detection, object avoidance, etc.

As described herein, a codeword pattern may also be referred to as one or more of a: coded light pattern, light point pattern, array of points, set of light points, dot pattern, set of dots, hole pattern, set of holes, set of aberrations, aberration pattern, coded pattern, artificial structure, pattern, mask, structured light pattern, non-uniform pattern, non-uniform codeword pattern, sparse remote sensing pattern, code pattern, code grid, sparse remote sensing codeword pattern, symbols, binary symbols, light grid, sensing pattern, remote sensing pattern, remote sensing coded pattern, sparse pattern, light map, projected light map, hybrid pattern, hybrid structured light pattern, mask holes, infrared (IR) pattern, IR pattern, IR mask, codewords, spatial codes, or any combination or variation thereto, etc. As described herein, a codeword pattern includes (or is formed by) a plurality of light points, which may also generally be referred to herein or in the art as, varying based on context, aberrations, holes, dots, pixels, points, codewords, codes, spatial codes, grids, lines, etc. Light points can be comprised of symbols, such as binary symbols.

In accordance with one or more aspects of the present disclosure, a structured light system can be configured to generate a depth map of a scene based on a codeword pattern. In some embodiments, the structured light system may be configured to transmit ("project") and receive ("detect," "sense," etc.) the codeword pattern. In other embodiments, the structured light system can be configured to only transmit or only receive the codeword pattern, while a separate device (e.g., a camera) can perform one of the transmit or receive. In some aspects, a structured light system may function as one or more standalone imaging devices or be implemented as part of one or more imaging devices, such as a camera, a smart phone, a virtual and/or augmented reality device, an imaging device with no display, etc.

In connection with one or more of a projector ("transmitter"), a receiver ("detector"), and a processor ("processing module"), a structured light system can be configured to, for example, project (e.g., via the projector) a codeword pattern onto a scene (e.g., a wall), detect (e.g., via the receiver) a reflection of the codeword pattern from the scene, and triangulate (e.g., via the processor) position disparities between codewords (or "light points," as referred to herein) on the projected codeword pattern and light points on the reflected codeword pattern. As one having ordinary skill in the art will understand, the position disparities can be caused by, for example, the reflected patterns being reflected from varying depths or distances from the structured light system, position differences between the projector and the receiver, or the like. Based on the triangulated position disparities, the structured light system can generate, or facilitate generating, depth information for one or more objects and/or object surfaces in the scene. Put another way, the structured light system can determine distances between light points on the codeword pattern to generate distances of objects from the structured light system to the scene, i.e., depth information. Based on the generated depth information, the structured light system can generate, or facilitate generating, a depth map illustrating distances of surfaces of scene objects from a particular viewpoint, e.g., from the viewpoint of the receiver and/or the projector. To facilitate determining the position disparities, the structured light system can identify codewords based on one or more detected properties of the codeword pattern (e.g., codeword boundaries) and then match properties of projected codewords with those of reflected codewords so as to determine codewords (or light points) for which to calculate disparities.

More specifically, transmitted light rays of a projection of codes (the codeword pattern) from a projector to an object in a scene are more parallel to received (incoming) codes reflected off of the surface of an object illuminated by the transmitted rays as the distance between the projector and/or the receiver and the object increases. Accordingly, the codewords, or light points, reflected from the object and received by the receiver(s) are closer to their original position (in the projected codeword pattern) when the object is further away. In contrast, the closer an object is to the projector and the receiver, the further the received codes are from the original position of the codes (in the projected codeword pattern) when they were transmitted. The structured light system calculates and utilizes a difference between the received and projected codeword positions to determine depth information including one or more depths of the scene or one or more objects in the scene. Thereafter, the structured light system can use the depth information to generate a depth map, e.g., a three-dimensional representation of the scene. As described herein, a structured light system may also be referred to as a "structured light active sensing system," "structured light modulation system," "structured light system with a module," "active sensing system," "light modulation system," or the like, or may broadly be referred to as a "structured light module," "structured light modulator," "light modulator," or the like.

Depending on use cases, it is often desirable for structured light systems to be small and portable, have large battery capacities, have the ability to project and detect codeword patterns at large distances, and to generate high-quality (e.g., high resolution) depth maps. Thus, structured light system manufacturers and/or codeword pattern designers may design structured light systems to balance these parameters. For example, as the physical size of a structured light system decreases (e.g., decreasing a camera size), designers may decrease battery capacity for the structured light system, for example. As another example, to enable the structured light system to detect objects at further distances, structured light system designers may increase laser power for the structured light system, as further described below. To balance this power intensity increase while maintaining various system power requirements, designers have been required to sacrifice one or more of battery capacity, device size, depth map resolution, etc. for the structured light system. More specifically, as a number of light points in a codeword pattern increases, so too does: a number of symbols for each codeword of the codeword pattern, a bandwidth per symbol, space required to display each symbol, etc. Furthermore, in structured light systems, as the number of light points in the codeword pattern increases, the resolution of the light points may decrease. Put another way, as spatial code size increases spatially, resolution of the depth mask may decrease.

The disclosures herein recite several example structured light system scenarios that include example values (e.g., example power values and example distance values). One having ordinary skill in the art will appreciate that the example values are simplified for illustrative purposes and that actual values may vary.

As one example, modern structured light systems may be configured to project and/or detect codeword patterns at distances up to about 4 meters or 13 feet. When designers wish to increase resolution for depth maps of such systems, they may increase this distance. In general, as an intensity (e.g., a light intensity) of the projected light points increases, so too does the distance that the light point is projected. Codeword patterns can be designed for specific use-cases, projects, and/or receivers, so as to specify light intensity for the light points of the codeword pattern. Often, the designed codeword patterns are then hardcoded onto a structured light system projector (e.g., a projector electrically coupled to and/or that comprises one or more components of a structured light module). As one example, a plurality of light points may be arranged according to a 4×2 codeword pattern. In other words, a plurality of light points may be distributed across a codeword pattern having a density of four light points by two light points. If a designer of the structured light system wishes to increase a distance that the 4×2 pattern of light points are projected, then laser intensity must be increased, which increases power consumption and accelerates battery power draining rates. If the designer wishes to maintain battery life for the structured light system, the designer may modify the codeword pattern to include a smaller resolution, e.g., a 2×2 codeword pattern. It will be appreciated that resolution of light points in a codeword pattern is directly related to what can be considered as a light point density, or point density, for the light points in the codeword pattern. Furthermore, as the density of the light points in the codeword pattern increases (e.g., more light points in the same space or the same number of light points in a smaller space), so too does the quality of the generated depth information (and thus depth maps) for the codeword pattern.

As used herein, "coupled" may include communicatively coupled, electrically coupled, magnetically coupled, physically coupled, optically coupled, and combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive electrical signals (digital signals or analog signals) directly or indirectly, such as via one or more wires, buses, networks, etc.

In structured light systems, codeword patterns may include a uniform intensity across all of the light points included in the codeword pattern. As one example, a codeword pattern may comprise an 8×8 light point density (or resolution). In this example, the light intensity for the entire 8×8 codeword pattern would be uniform; thus, for example, each of the light points would be projected at an equal intensity level. For illustration, a structured light system projecting such a codeword pattern may consume, for example, 200 milliwatts (mW) to project the codeword pattern. Based on this light intensity level, the structured light system may be capable of sensing surfaces that are, for example, 4 meters (m) from the receiver of the structured light system.

Continuing with this example, as described above, if the system designer wants to configure the example structured light system to detect surfaces at a further distance than 4 meters, the designer may decrease the codeword pattern density, for example, to a 4×4 density (or resolution). In this way, the structured light system may consume 250 mW when projecting the 4×4 codeword pattern at an intensity four times that at which the device would have been capable of projecting the 8×8 codeword pattern. Thus, the structured light system will be capable of projecting the 4×4 codeword pattern four times further (16 meters) than it would have been capable of projecting the 8×8 codeword pattern (4 meters) at similar power levels. However, as one having ordinary skill in the art will understand, because the light point density of the 4×4 codeword pattern (a total of 16 light points) is only one-quarter of the light point density of the 8×8 codeword pattern (a total of 64 light points), the depth map generated based on the projected 4×4 codeword pattern will have only one-quarter of the resolution of the depth map generated by the 8×8 codeword pattern device. That is, structured light system designers may be limited to choosing between a high-resolution depth map that includes depth information for objects at a short distance and a low-resolution depth map that includes depth information for objects at a further distance.

Thus, structured light systems that can detect objects in a scene at larger distances, while maintaining high-quality depth map resolutions, acceptable battery levels, and small device sizes, are desired. To that end, systems and methods are provided for a hybrid depth map codeword pattern design that allows for a structured light system to generate a depth map including high-quality representations for an entire depth map at a first distance from the sensor, while also including lower-quality representations for sparse locations of the depth map at a second, further distance from the sensor. Put another way, systems and methods for generating a multi-layer, structured light depth map of a scene based on a single codeword pattern that includes a first set of light points for sensing objects at a first distance and generating depth information, at a first resolution, for the objects at the first distance, and further includes a second set of light points for sensing objects at a second distance greater than the first distance and for generating depth information, at a second resolution lower than the first resolution, for the objects at the second distance are described herein. The codeword pattern can also include high-intensity groups of light points made up of light points in the second set of light points, at sparse locations, for sensing objects at greater distances and generating depth information at a lower resolution. Therefore, the systems and methods described herein enable generating a structured light depth map based on a "hybrid" codeword pattern. In other words, the codeword pattern can include a first set of light points projected at a first intensity (and thus for being detected at a first distance) in addition to a second set of light points projected at a second intensity greater than the first intensity (and thus for being detected at a second distance greater than the first distance). In this way, the codeword pattern can be designed to optimize both depth map distance and quality.

As further described below, based on this flexible design, battery consumption, remote pattern resolution, and maximum distance for the corresponding structured light system can be balanced to enable generating a depth map including both a high-resolution depth map layer with depth information for objects at a first distance and a lower-resolution depth map layer with depth information for objects at a further distance. The power consumption for each of the layers can be balanced (based on adjusting light point intensities and densities for each of the layers) to allow for compliance with structured light system power requirements while maintaining desired depth map quality levels (resolutions), in addition to maintaining desired depth map projection and detection distances.

FIG. 1 illustrates an example of a structured light system 100 ("the system") in which aspects of the present disclosure can be employed. In an aspect, the structured light system 100 can generate a depth map (not pictured) of a scene 106, as described in connection with FIGS. 4, 7, and 9. The structured light system 100 can include at least a projector 102 and a receiver 108. The projector 102 can be configured to project a codeword pattern 104 onto the scene 106 to illuminate the scene 106, as described in connection with FIGS. 3, 5, and 6. As described herein, the projector 102 may also be referred to as a "transmitter," and the receiver 108 may also be referred to as a "detector," "sensor," "sensing element," "photodetector," etc. The projector 102 can further comprise at least a laser source 124, a lens 126, and a light modulator 128. In some embodiments, the projector 102 can further include a diffractive optical element (DOE). In some aspects, the light modulator 128 may comprise a DOE. As illustrated, the projector 102 can be positioned on the same baseline reference plane as the receiver 108.

The codeword pattern 104 can be hardcoded on the structured light system 100 (e.g., at the projector 102), as will be further described in connection with FIG. 3. In accordance with aspects of the present disclosure, the codeword pattern 104 can be designed such that the codeword pattern 104 causes the projector 102 to project light points of the codeword pattern 104 at varying intensities, as described in connection with FIG. 6. The receiver 108 can be configured to detect (or "sense"), from the scene 106, a reflection 110 of the codeword pattern 104. In an aspect, one or more components of the structured light system 100 may be designed to include minor thickness aberrations of particular depths, for example, having depths of 400 nanometers. Via the minor thickness aberrations, the codeword pattern 104 can be designed for the particular projector 102 in association with the laser source 124.

The projector 102 can transmit a laser beam from the laser source 124 through the lens 126 and onto the scene 106. Furthermore, since the codeword pattern 104 can be hardcoded on the projector 102 on one single sheet (not pictured), the structured light system 100 (via the projector 102) can control the shape of the laser beam from the laser source 124 as it is projected onto the scene 106. In this way, the projector 102 projects the codeword pattern 104 from one single sheet onto the scene 106.

The structured light system 100 can further be configured to determine one or more light point distances between locations of light points in the projected codeword pattern 104 and locations of corresponding light points in the reflection 110. For example, the structured light system 100 may be configured to determine light point distances 116 and 118, which each illustrate a distance between a location of a light point in the projected codeword pattern 104 (e.g., as illustrated by the leftmost vertical dashed line) and a location of a corresponding light point on the reflection 110 (e.g., as illustrated by the two rightmost vertical dashed lines). As illustrated, the light point distance 116 corresponding to the reflected light point of the codeword pattern 104 at the further distance (e.g., the upper reflected portion of the scene 106) is greater than the light point distance 118 corresponding to the reflected light point of the codeword pattern 104 at the closer distance (e.g., the lower reflected portion of the scene 106). Based on the determined light point distances 116 and 118, the structured light system 100 can be configured to generate the depth map of the scene 106, as further described in connection with FIGS. 4, 7, and 9.

As one example, the codeword pattern 104 can be projected via the projector 102 to illuminate the scene 106 and obtain depth information with which to generate 3-dimensional ("3D") information from 2-dimensional (2D") images and/or information. Herein, for clarity of description, "scene" may be used to refer to either or both a scene and an object depending on the context used. For example, a scene may include a single object of interest, or a plurality of objects of interest. The receiver 108 captures the reflection 110 and codewords therein. By covering the scene 106 with unique codewords in this manner, sections/portions of the scene 106 may be identified by reflected codewords and this information may be used for sensing the distance (depth) from the sensing device to objects in the scene.

Although a number of separate components are illustrated in FIG. 1, those of skill in the art will recognize that one or more of these components may be implemented not only with respect to the functionality described above, but also to implement the functionality described above with respect to other components. For example, the projector 102 may be used to implement not only the functionality described above with respect to the projector 102, but also to implement the functionality described above with respect to the receiver 108. Each of the components illustrated in FIG. 1 may be implemented using a plurality of separate elements.

Figure 2:
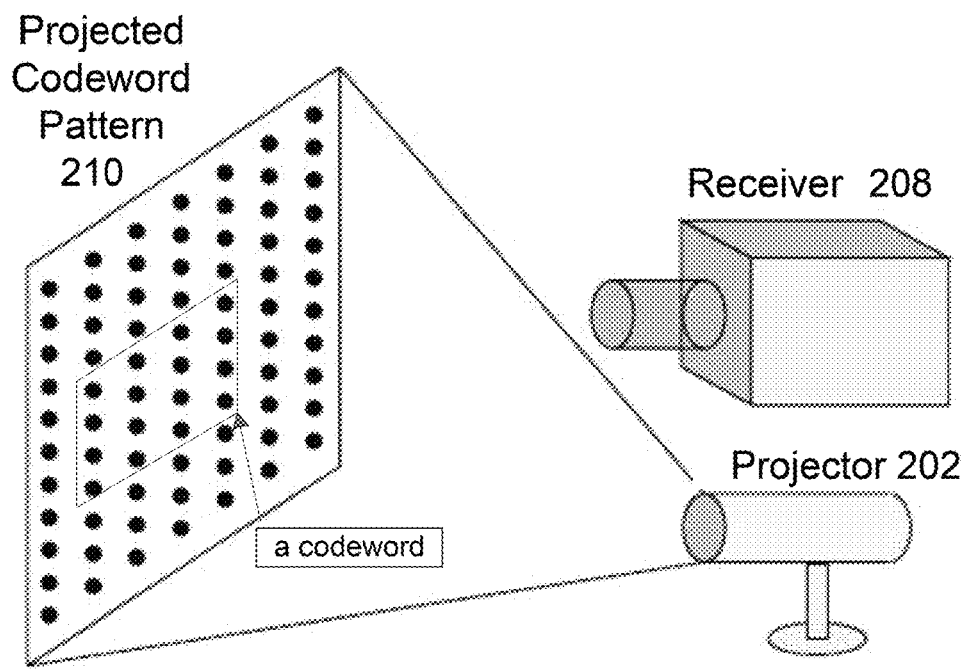
FIG. 2 illustrates an example of a structured light system in which aspects of the present disclosure can be employed.

FIG. 2 illustrates an example of a structured light system 200 in which aspects of the present disclosure can be employed. With respect to the description of FIG. 2 herein, some of the item numbers may refer to the so-numbered aspects described above in connection with FIG. 1. For example, the projector 202 and the receiver 208 illustrated in FIG. 2 may correspond to the projector 202 and the receiver 208 illustrated in FIG. 1. In an aspect, the projector 202 may project the codeword pattern 104 of FIG. 1 so as to illuminate the scene 106 of FIG. 1 with a projected codeword pattern 210. The projected codeword pattern 210 can comprise an infrared laser field. The projected codeword pattern 210 can comprise a point matrix pattern comprising a plurality of light points (e.g., represented by each of the black dots), each light point corresponding to a 0 (light blocked) or a 1 (light-pass through). The light points may be organized into codewords, each codeword comprising an array of projected light points (e.g., in a 4 by 4 array, as shown by the illustrated "codeword"). In some embodiments, the projected codeword pattern 210 can be associated with a DOE (e.g., the light modulator 128, in some embodiments) configured to diffract a laser or light field projected by the projector 202 to project a plurality of codewords onto the scene 106 of FIG. 1. The receiver 208 may comprise a camera configured to receive the infrared image projected by the projector 202 through the projected codeword pattern 210 onto the scene 106 of FIG. 1.

Although a number of separate components are illustrated in FIG. 2, those of skill in the art will recognize that one or more of these components may be implemented not only with respect to the functionality described above, but also to implement the functionality described above with respect to other components. For example, the projector 202 may be used to implement not only the functionality described above with respect to the projector 202, but also to implement the functionality described above with respect to the receiver 208. Each of the components illustrated in FIG. 2 may be implemented using a plurality of separate elements.

Figure 3:
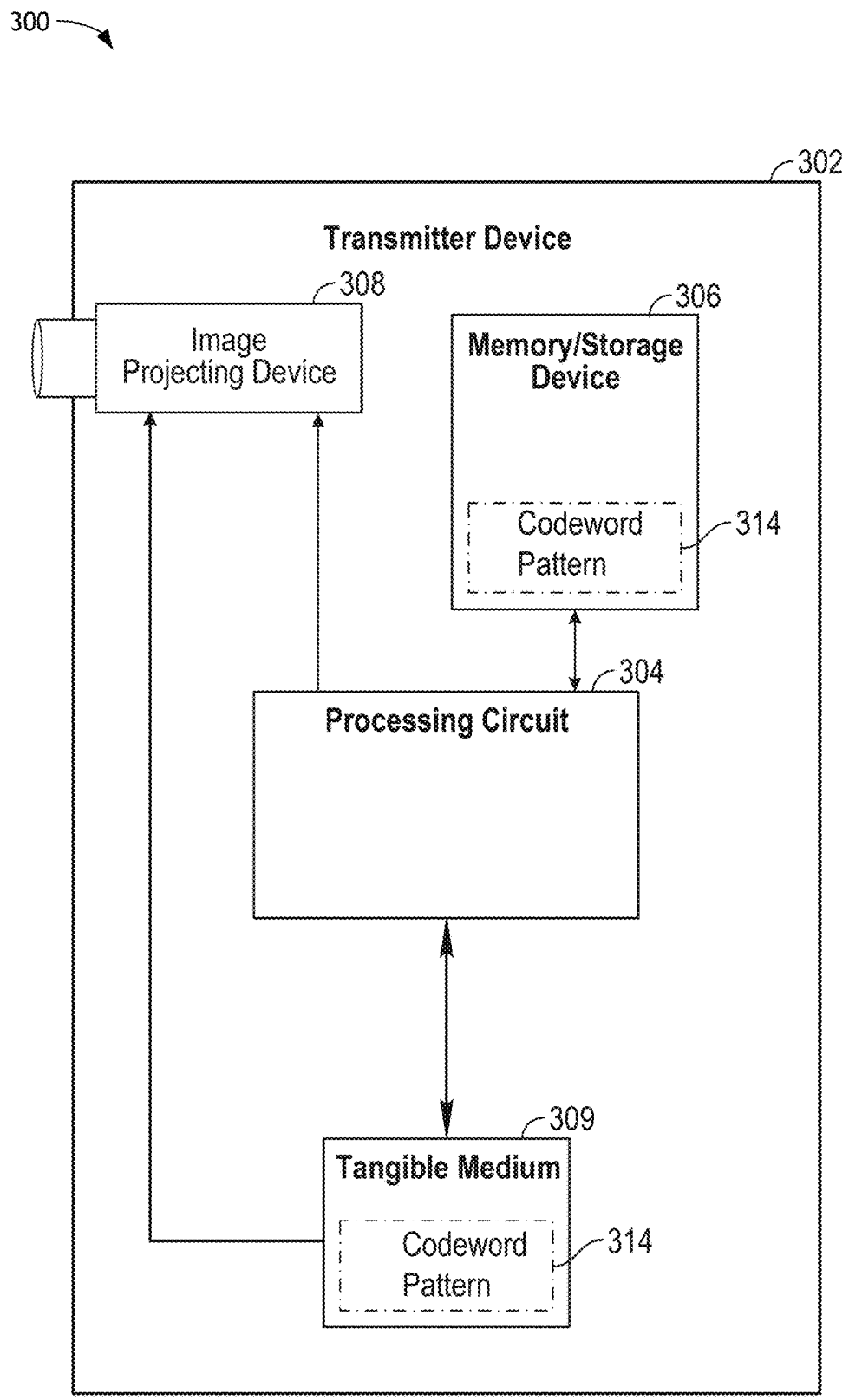
FIG. 3 is a block diagram of an example projector for projecting a codeword pattern onto a scene in accordance with one or more embodiments.

FIG. 3 is a block diagram 300 of an example projector 302 (e.g., the projector 102 or the projector 202) for projecting a codeword pattern (e.g., the codeword pattern 104) onto a scene (e.g., the scene 106) in accordance with one or more embodiments. In an aspect, the projector 302 can project a codeword pattern 314, via an image projecting device 308, so as to produce a projected codeword pattern (e.g., the projected codeword pattern 210). The projector 302 may include a processing circuit 304 (or processor) coupled to a memory/storage device 306, the image projecting device 308, and/or a tangible medium 309.

In an aspect, the codeword pattern 314 may comprise a fixed codeword pattern (e.g., a fixed mask pattern) hard-coded at the projector 302. In such case, the tangible medium 309 may define, include, and/or store the codeword pattern 314. The codeword pattern 314 may be implemented in hardware as a pre-defined and/or hardcoded codeword pattern according to any suitable means, e.g., in association with a DOE of the projector 302. As illustrated in FIG. 3, the codeword pattern 314 includes a dashed line to indicate multiple possible locations within the projector 302 for storing the codeword pattern 314, based on different embodiments of the projector 302. In one embodiment, the codeword pattern 314 may be located at both the tangible medium 309 and the memory/storage device 306.

In accordance with one or more embodiments, the projector 302, via the image projecting device 308, can project the codeword pattern 314 according to varying intensities based on a design of the codeword pattern 314. As described above, some codeword patterns may project a codeword pattern at a single, uniform intensity. Systems and methods described herein enable the projector 302 to project the codeword pattern 314 with spatially varying light point intensities (e.g., dot intensities). Such aspects are further described below in connection with FIG. 6.

Figure 4:
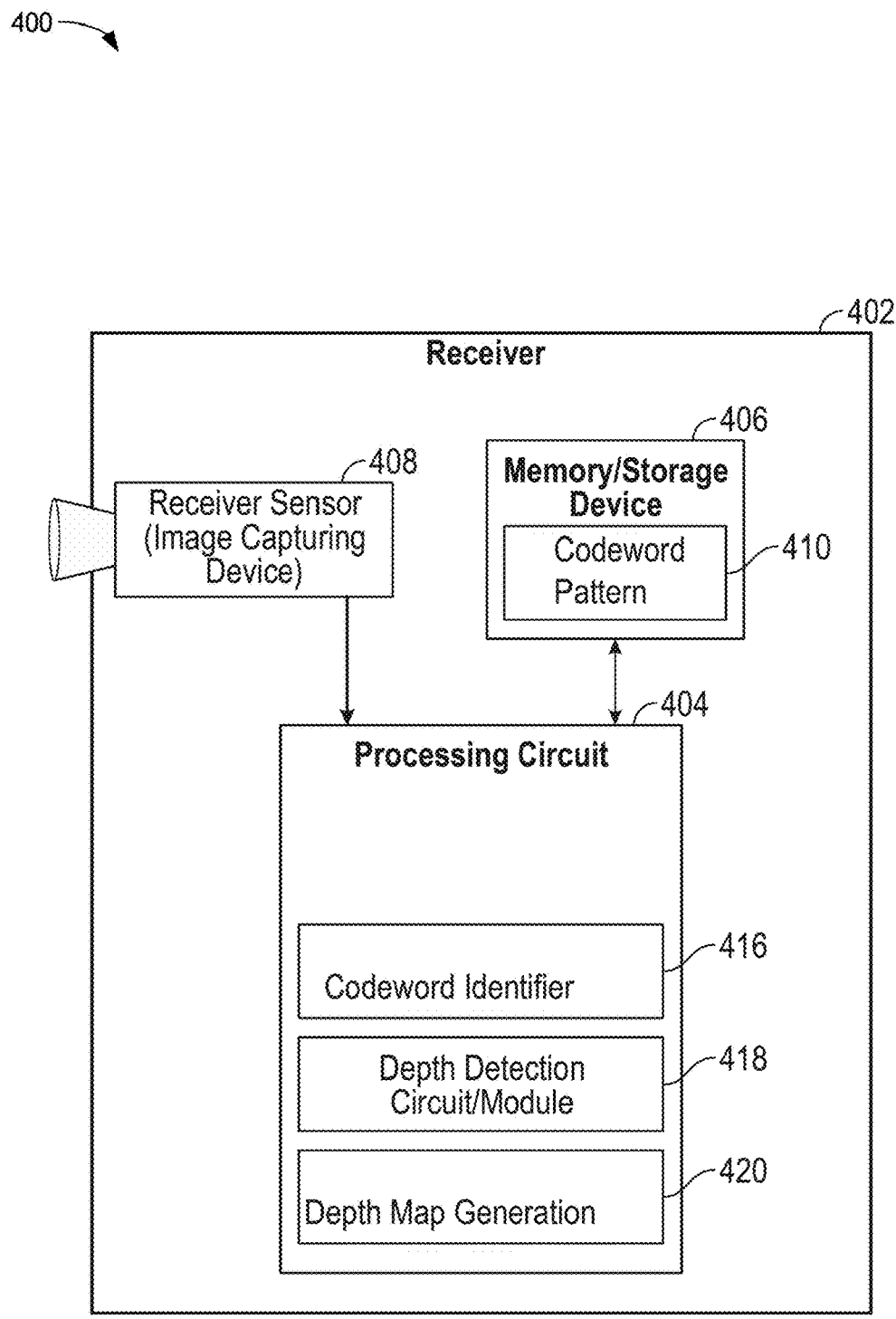
FIG. 4 is a block diagram of an example receiver for detecting a reflection of a codeword pattern from a scene in accordance with one or more embodiments.

FIG. 4 is a block diagram 400 of an example receiver 402 (e.g., the receiver 108 or the receiver 208) for detecting ("receiving") a reflection (e.g., the reflection 110) of a reflected codeword pattern 410 (e.g., the codeword pattern 104, the projected codeword pattern 210, or the codeword pattern 314) from a scene (e.g., the scene 106) in accordance with one or more embodiments. Based on the reflection 110, the receiver 402 can generate, or facilitate generating, depth information for the scene 106 or one or more objects of the scene 106, and generate, or facilitate generating, a depth map of the scene 106 based on the depth information. The receiver 402 may include a processing circuit 404 coupled to a memory/storage device 406 and a receiver sensor 408 (e.g., an image capturing device). In some aspects, the receiver sensor 408 may comprise an image capture device, for example, a camera.

As one example, the receiver 402 may detect the reflection 110, via the receiver sensor 408, by detecting a first set of light points of the reflected codeword pattern 410 (e.g., reflected from the scene) at a first distance from the receiver 402 and detecting a second set of light points of the reflected codeword pattern 410 (e.g., reflected from the scene) at a second distance from the receiver. As further described below in connection with FIG. 6, the first and second distances can be based on first and second sets of light points being projected, for example, from the projector 302, at first and second intensities. In an aspect, the first set of light points and the second set of light points can be mutually exclusive. In another aspect, the codeword pattern (e.g., the reflected codeword pattern 410) can comprise a total number of light points, wherein the number of light points included in the first set of light points is equal to a first value, a number of light points included in the second set of light points is equal to a second value, and wherein a sum of the first value and the second value is equal to the total number of light points. Furthermore, in another aspect, each of the light points included in the first and second sets of light points can be projected from a projector (e.g., the projector 302) at the same time (e.g., simultaneously; from the same sheet).

As further described below in connection with FIG. 6, the receiver 402, in some embodiments, can be configured to generate, via a depth map generation module 420, first and second depth map layers for the depth map based on the first and second sets of light points. A codeword identifier 416 and a depth detection circuit/module 418 located within the processing circuit 404 can facilitate one or more of reflected light detection, depth information determination, and depth map generation. When processing, analyzing, generating based on, determining based on, or otherwise, with respect to the reflected codeword pattern 410, the receiver 402 can store the codeword pattern 410, and/or information related to the reflected codeword pattern 410, at the memory/storage device 406.

As one example of detecting the projected codeword pattern 210 (e.g., as the reflected codeword pattern 410), the receiver sensor 408 can be configured to obtain at least a portion of the projected codeword pattern 210 on the surface of one or more objects in the scene 106. The projected codeword pattern 210 can be defined by uniquely identifiable spatially-coded codewords defined by a plurality of symbols included within the projected codeword pattern 210 according to the design of the codeword pattern 104 (or the codeword pattern 314). In one example, the receiver sensor 408 may capture the projected codeword pattern 210 in the infrared spectrum.

In an aspect, the codeword identifier 416 may be configured to obtain a codeword from a window defined within the portion of the projected codeword pattern 210 and/or the reflected codeword pattern 410. The depth detection circuit/module 418 may be configured to receive image data (e.g., adjusted image data from the distortion adjustment circuit/module 414) and detected codewords by the codeword identifier 416 to obtain depth information for a surface portion of the target object corresponding to the window based on: (a) a single projection of the code mask, and (b) a displacement of the window relative to a known reference code mask. In other words, as further described below in connection with FIG. 6, the receiver 402 can determine one or more light point distances between locations of light points in the projected codeword pattern (e.g., the projected codeword pattern 210) and locations of corresponding light points in the reflection of the codeword pattern (e.g., the reflected codeword pattern 410). Based on the determined light point distances, the receiver 402 can generate a first depth map layer, for example. Such aspects are further described below in connection with FIG. 6. In an aspect, the depth map generation module 420 may be configured to assemble a depth map for the object in the scene 106 based on a plurality of codewords detected as different overlapping windows within the portion of the undistorted code mask.

Figure 5:
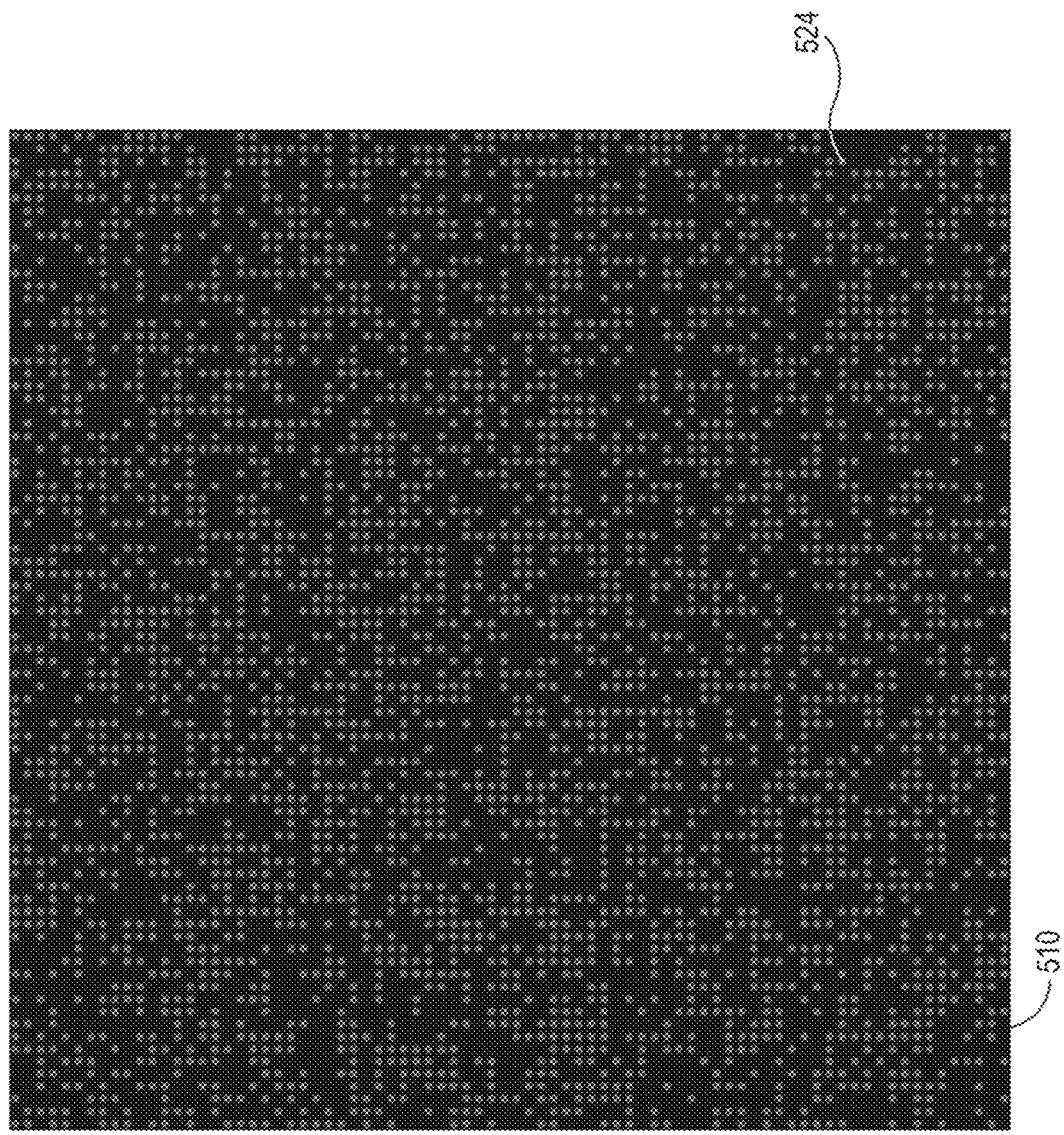
FIG. 5 illustrates a structured light pattern having a single, uniform light point intensity.

FIG. 5 illustrates a structured light pattern with uniform dot intensity 510. The light points may also be referred to as "dots." A depth map (not pictured) of the scene 106 (for example) can be generated based on the projector 302 projecting, onto the scene 106, the structured light pattern with uniform dot intensity 510. As illustrated, the structured light pattern with uniform dot intensity 510 is designed such each of a set of light gray points 524 (e.g., all of the light points) are projected at the same (e.g., uniform) intensity. Based on the level of the projection intensity, the projector 302 can project each of the light gray points 524 the same distance. Thus, in general, the receiver 402 can detect or sense objects in the scene 106 at a uniform distance according to the uniform intensity. The receiver 402 can determine light point distances (not pictured), which can represent disparities between light point locations of light points projected on the projected codeword pattern 210 (according to the structured light pattern with uniform dot intensity 510) and corresponding light points projected on the reflected codeword pattern 410 (according to the structured light pattern with uniform dot intensity 510). Based on the determined light point distances, the receiver 402 can generate a uniform depth map layer, as further described below in connection with FIG. 7.

Figure 6:
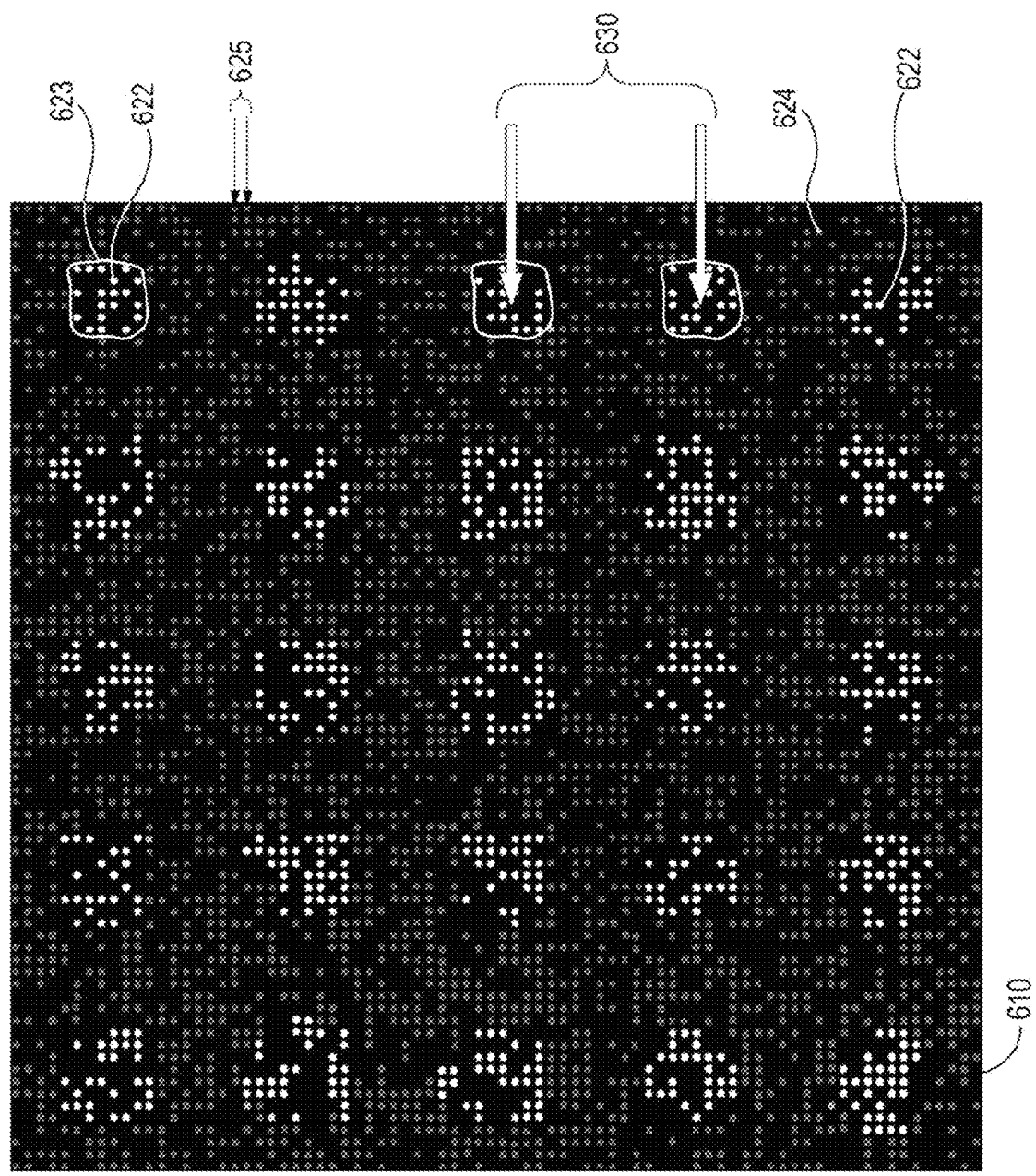
FIG. 6 illustrates a structured light pattern having a spatially varying light point intensity, in accordance with one or more embodiments described herein.

FIG. 6 illustrates a structured light pattern with spatially varying dot intensity 610 (e.g., having spatially varying light point intensities), in accordance with one or more embodiments described herein. The light points may also be referred to as "dots." In accordance with one or more embodiments, systems and methods described herein enable projecting the structured light pattern with spatially varying dot intensity 610 according to multiple intensities of light at the same time.

As one example, one exemplary method can include generating a depth map (not pictured) of the scene 106. The depth map can be generated based on the projector 302 projecting, onto the scene 106, the structured light pattern with spatially varying dot intensity 610. Furthermore, the structured light pattern with spatially varying dot intensity 610 is designed such that the plurality of light points include a first set of light points projected at a first intensity and a second set of light points projected at a second intensity greater than the first intensity. For example, the first set of light points can comprise each of a set of light gray points 624, and the second set of light points can comprise each of a set of bright white points 622. For illustrative purposes, a light point distance 625 is shown to represent a distance between two of the light gray points 624.

In another embodiment, the light points of the structured light pattern with spatially varying dot intensity 610 can have more than two levels of brightness. In one aspect, the system can be configured to identify the bright white points 622 as including only the light points have the most intense level of brightness. In another aspect, the system can be configured to identify the bright white points 622 as including the light points that are not the lowest intensity level or that have an intensity above a certain level. In other embodiments, the system can interpret the different levels of brightness for the light points as multiple layers for generating a depth map, as further described below in connection with FIG. 8.

In the illustrated example, all of the light points (e.g., all of the bright white points 622 and the light gray points 624) per unit area across the entirety of the structured light pattern with spatially varying dot intensity 610 are distributed across the structured light pattern with spatially varying dot intensity 610 at a first density. Further in the illustrated example, the second set of light points are arranged in a plurality of bright white point groups 623 at a second density, i.e., a 5×5 distribution of bright white point groups 623 is distributed across the structured light pattern with spatially varying dot intensity 610. For illustrative purposes, in the top-right corner of FIG. 6, an irregular white shape outlines one of the bright white point groups 623. For further illustrative purposes, two additional bright white point groups 623 are outlined, at the same location where a group peak distance 630 illustrates a distance between two example peak brightness light points in the center of the two additionally outlined bright white point groups 623. The shape of the outlines is for illustrative purposes only.

By nature of the bright white point groups 623 consisting of collections of the bright white points 622, it should be apparent that the second density is less than the first density, i.e., that the spatial distribution of bright white point groups 623 per unit area across the structured light pattern is less than the spatial distribution of all of the light points (e.g., all of the bright white points 622 and the light gray points 624) per unit area across the structured light pattern. Put another way, the second set of light points (e.g., the bright white points 622) is arranged into a 5×5 (as one example) grid of groups, and this 5×5 density (or resolution) is less than the density of the first set of light points (e.g., the sum of all of the light points).

Continuing with this example, the projector 302 can project the first set of light points a first distance based on projecting the first set of light points at the first intensity. Furthermore, the projector 302 can project the second set of light points a second distance, greater than the first distance, based on projecting the second set of light points at the second intensity. Furthermore, each of the plurality of groups (e.g., the bright white point groups 623) can include a peak intensity location, e.g., a location near a center of each of the plurality of groups where the light intensity is greatest. In an aspect, the peak intensity location could be a center of one of the bright white point groups 623, as is illustrated by the points of the arrows connecting the group peak distance 630.

In general, the first set of light points, projected at a first intensity, allow for the receiver 402 to detect or sense objects in the scene 106 at a first distance according to the first intensity. Additionally, the bright white points 622 (e.g., the high intensity groups of dots), projected at second intensities being higher than the first intensity, allow sensing/detection of objects at second distances greater than the first distances. The structured light system 100 can measure distances between the first intensity single dots (e.g., the light point distance 625) to determine the first distances (at a high resolution), and the structured light system 100 can measure distances between peaks of dot groups (e.g., the group peak distance 630) to determine the further distances (at a lower resolution).

In other words, continuing with the above example, the receiver 402 can detect, from the scene 106, the reflection 110 of the structured light pattern with spatially varying dot intensity 610. Thereafter, the receiver 402 can determine one or more light point distances between locations of light points in the projected codeword pattern and locations of corresponding light points in the reflection of the codeword pattern. That is, the receiver 402 can determine light point distances (e.g., the light point distance 625), which represents a disparity between a light point location of a light point projected on the projected codeword pattern 210 (according to the structured light pattern with spatially varying dot intensity 610) and a corresponding light point projected on the reflected codeword pattern 410 (according to the structured light pattern with spatially varying dot intensity 610). Based on the determined light point distances 625, the receiver 402 can generate a first depth map layer as described in connection with FIG. 7.

Similarly, continuing with this example, the receiver 402 can determine one or more group peak distances. The group peak distances can represent a distance between the above described peak intensity locations in the structured light pattern with spatially varying dot intensity 610 and corresponding peak intensity locations in the reflection of the codeword pattern. That is, the receiver 402 can determine group peak distances (e.g., the group peak distance 630), which represents a disparity between a group peak intensity location of a group (e.g., one of the bright white point groups 623) projected on the projected codeword pattern 210 (according to the structured light pattern with spatially varying dot intensity 610) and a corresponding group peak intensity location projected on the reflected codeword pattern 410 (according to the structured light pattern with spatially varying dot intensity 610). Based on the determined group peak distances 630, the receiver 402 can generate a second depth map layer as described in connection with FIG. 7.

Figure 7:
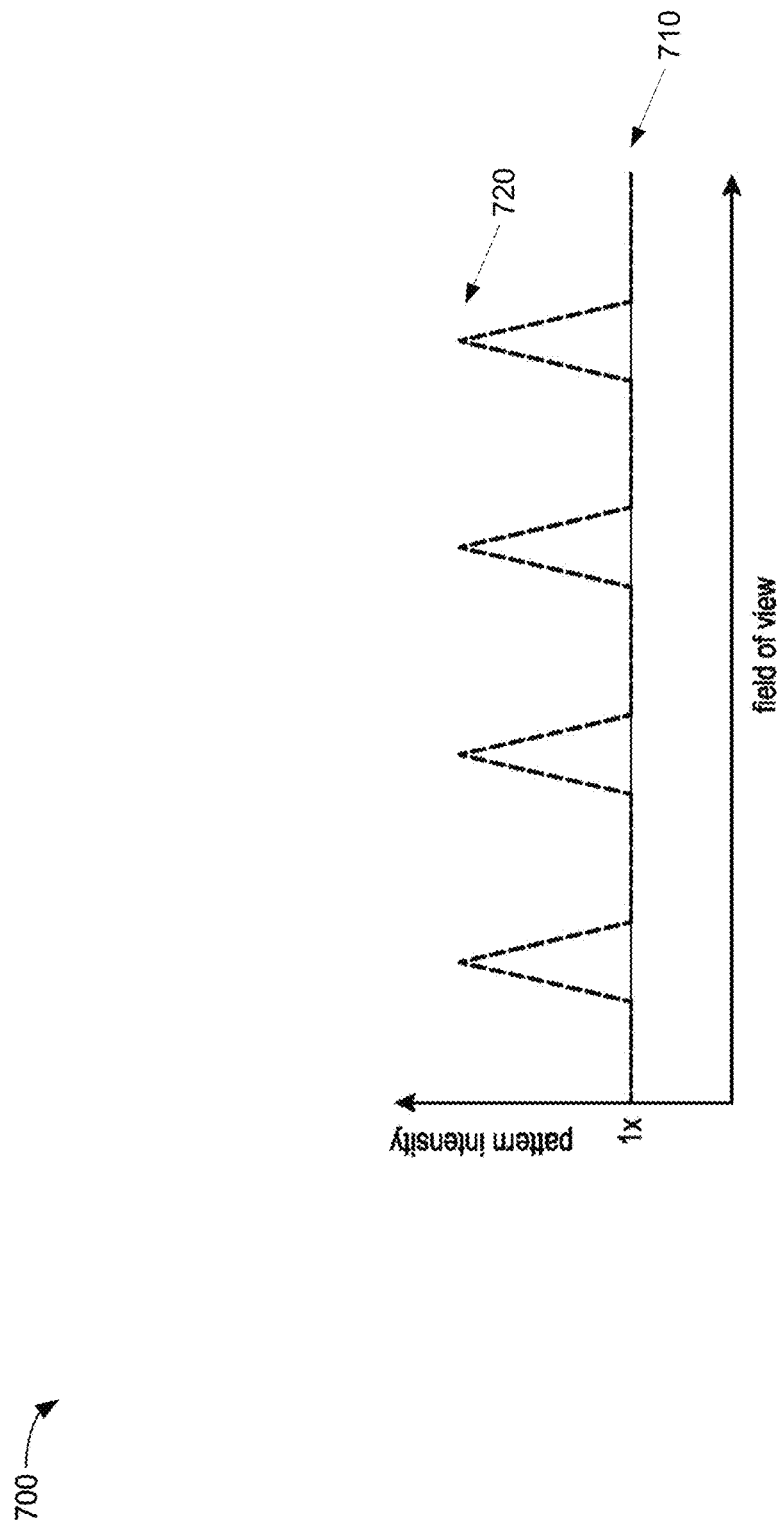
FIG. 7 illustrates a set of intensity plots for first and second depth map layers according to a field of view of a structured light pattern being projected onto a scene in accordance with one or more embodiments.

FIG. 7 illustrates a set of intensity plots 700 for first and second depth map layers according to a field of view of a structured light pattern with spatially varying dot intensity (e.g., the structured light pattern with spatially varying dot intensity 610 described in connection with FIG. 6) being projected onto a scene (e.g., the scene 106) in accordance with one or more embodiments. As described above, based on the determined light point distances 625, the receiver 402 can generate a first depth map layer at a first resolution (e.g., as represented by corresponding pattern intensity by the solid line). The first depth map layer indicator 710 represents the intensity level (according to the pattern intensity vertical axis) for the first depth map layer. Similarly, the second depth map layer indicator 720 represents the intensity level (according to the pattern intensity vertical axis) for the second depth map layer. As further described above, based on the determined group peak distances 630, the receiver 402 can generate a second depth map layer at a second resolution lower than the first resolution (e.g., as represented by corresponding pattern intensity by the dashed line). That is, the second depth map layer is based on the determined group peak distances 630, which is further based on the second density (as described above). The first depth map layer can be based on the first density (as described above) and can be generated at a first resolution higher than the second resolution.

As an example, the hybrid depth map codeword pattern can include at least two layers as described above. As one nonlimiting example, the first layer can be similar to a grid for a structured light pattern with uniform dot intensity. The pattern intensity over the field of view for the first depth map layer is illustrated by a first depth map layer indicator 710, which is a constant, horizontal line. The second layer can include a sparse pattern of points that make up a portion of the entire grid. Thus, continuing with the examples above, the pattern can be designed such that each of all of the plurality of points in the first layer are projected at an intensity that allows for sensing surfaces at, for example, 4 meters (as one example, for a 200 mW power consumption), and each of the smaller amount of light points of the second layer can be projected at an intensity that allows for sensing surfaces at, for example, 8 meters (e.g., twice that of the first intensity, or, an additional 50 mW power consumption, totaling 250 mW). As described above, if designers utilizing the structured light pattern with spatially varying dot intensity 610 wish to operate the structured light system 100 so as to consume a strict 200 mW (rather than 250 mW), the pattern could be designed such that the first layer points are projected at an intensity that allows for detecting surfaces at a distance slightly below 4 m, and such that the second layer points are projected at an intensity that allows for detecting surfaces at a distance slightly below 8 m. The structured light system 100 will still utilize about 25% of the power to project the second layer than that required for the first layer, and designers can have the freedom to adjust the values according to their device design requirements. The pattern intensity over the field of view for the second depth map layer is illustrated by a second depth map layer indicator 720, which is a dashed line.

Thus, the systems and methods described herein enable the structured light system 100 to generate a depth map that includes representations of surfaces at 4 m from the sensor (at resolutions according to the 8×8 grid), in addition to representations of surfaces 8 m from the sensor (at resolutions according to the 4×4 grid), with little to no increase in power requirements, depending on design requirements. In one aspect, the first and second representations can be layered such that the final depth map combines all of the information provided by both layers. In some embodiments, the intensity of the dots in the first and/or second layers can be increased or decreased to increase or decrease, respectively, the sensing distance for their respective dot pattern locations.

As an additional example based on the above described aspects of this disclosure, it can be appreciated that projecting the codeword pattern (e.g., the codeword pattern 314) onto the scene 106 comprises transmitting the codeword pattern 314 from the projector 302 located at a first position (e.g., as illustrated in one of FIGS. 1 and 2). It can be appreciated then that detecting the reflected codeword pattern 410 of the projected codeword pattern 210 comprises receiving the reflected codeword pattern 410 at the receiver 402, for example, the receiver 402 being located at a second position (e.g., as illustrated in one of FIGS. 1 and 2). Thus, the one or more light point distances (e.g., based on the light point distances 625) and the one or more group peak distances (e.g., based on the group peak distances 630) are resultants of a difference between the first position and the second position. Furthermore, as described above, generating the first and second depth map layers is based on triangulating codeword positions according to the one or more light point distances and the one or more group peak distances.

Furthermore, as is desired, additional layers can be added to the pattern, for example, where each successive additional mask layer includes smaller resolution patterns with higher intensities (e.g., allowing for further detectable distances). An example of this, is illustrated at FIG. 8.

Figure 8:
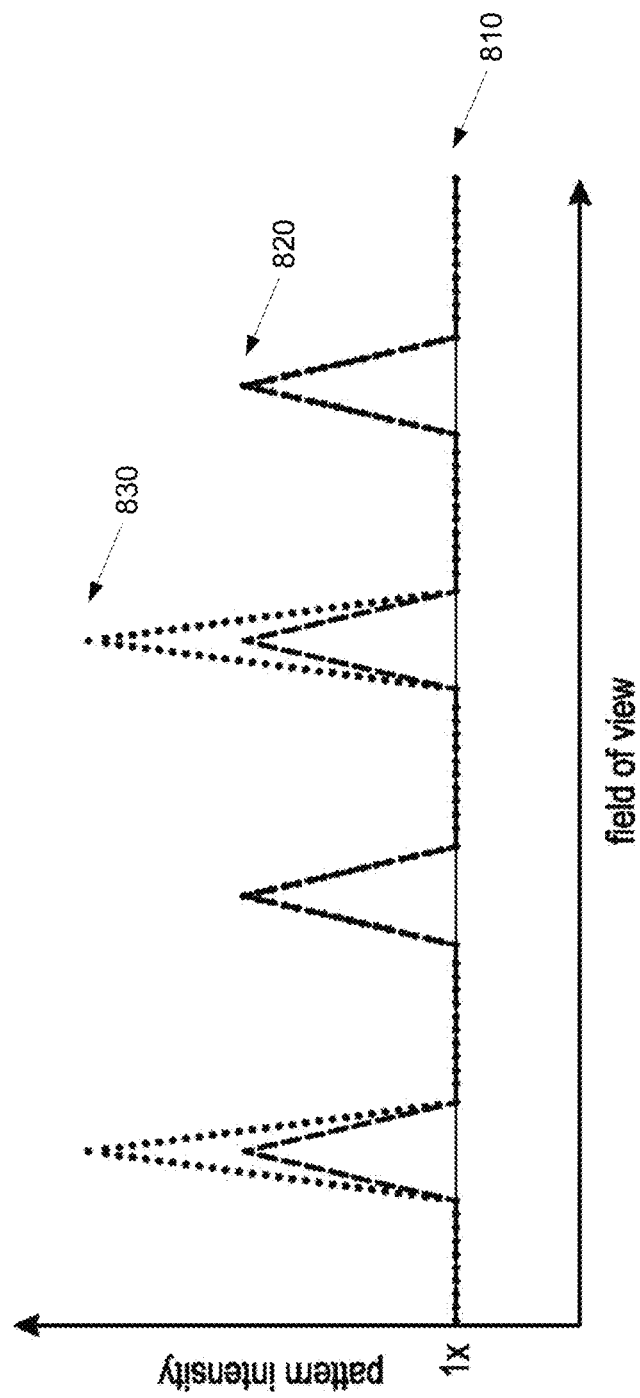
FIG. 8 illustrates a plot of first, second, and third intensities of example first, second, and third depth map layers according to a field of view of the structured light pattern with spatially varying dot intensity being projected onto a scene according to first, second, and third sets of light points, in accordance with one or more embodiments.

FIG. 8 illustrates a plot 800 of first, second, and third intensities of example first, second, and third depth map layers according to a field of view of the structured light pattern with spatially varying dot intensity 610 being projected onto a scene (e.g., the scene 106) according to first, second, and third sets of light points. As described above, based on the determined light point distances 625, the receiver 402 can generate a first depth map layer at a first resolution (e.g., as represented by corresponding pattern intensity by the solid line). That is, the pattern intensity over the field of view for the first depth map layer is illustrated by a first depth map layer indicator 810, which is a constant, horizontal line. As further described above, based on the determined group peak distances 630, the receiver 402 can generate a second depth map layer at a second resolution lower than the first resolution (e.g., as represented by corresponding pattern intensity by the dashed line). That is, the second depth map layer is based on the determined group peak distances 630, which is further based on the second density (as described above), and the pattern intensity over the field of view for the second depth map layer is illustrated by a second depth map layer indicator 820, which is a dashed line. The first depth map layer is based on the first density (as described above) and at a first resolution (higher than the second resolution).

Furthermore, the plurality of light points includes a third set of light points projected a third distance based on further projecting the third set of light points at a third intensity (e.g., represented by the higher peak dotted lines). The pattern intensity over the field of view for the third depth map layer is illustrated by a third depth map layer indicator 830, which is a dotted line. As is illustrated, the third intensity is greater than the second intensity. Further based on the descriptions above, it can be appreciated that the third set of light points in this example are distributed across the codeword pattern at a third density that is lower than the second density. The system can be configured for determining one or more additional distances based on locations of the third set of light points in the projected codeword pattern and in the reflection of the codeword pattern. In addition, the system can be configured for, based on the determined additional distances, generating a third depth map layer at a third resolution, wherein the third resolution is based on the third density, and wherein generating the depth map of the scene, wherein the depth map includes depth information for the scene according to each of the first, second, and third depth map layers.

Figure 9:
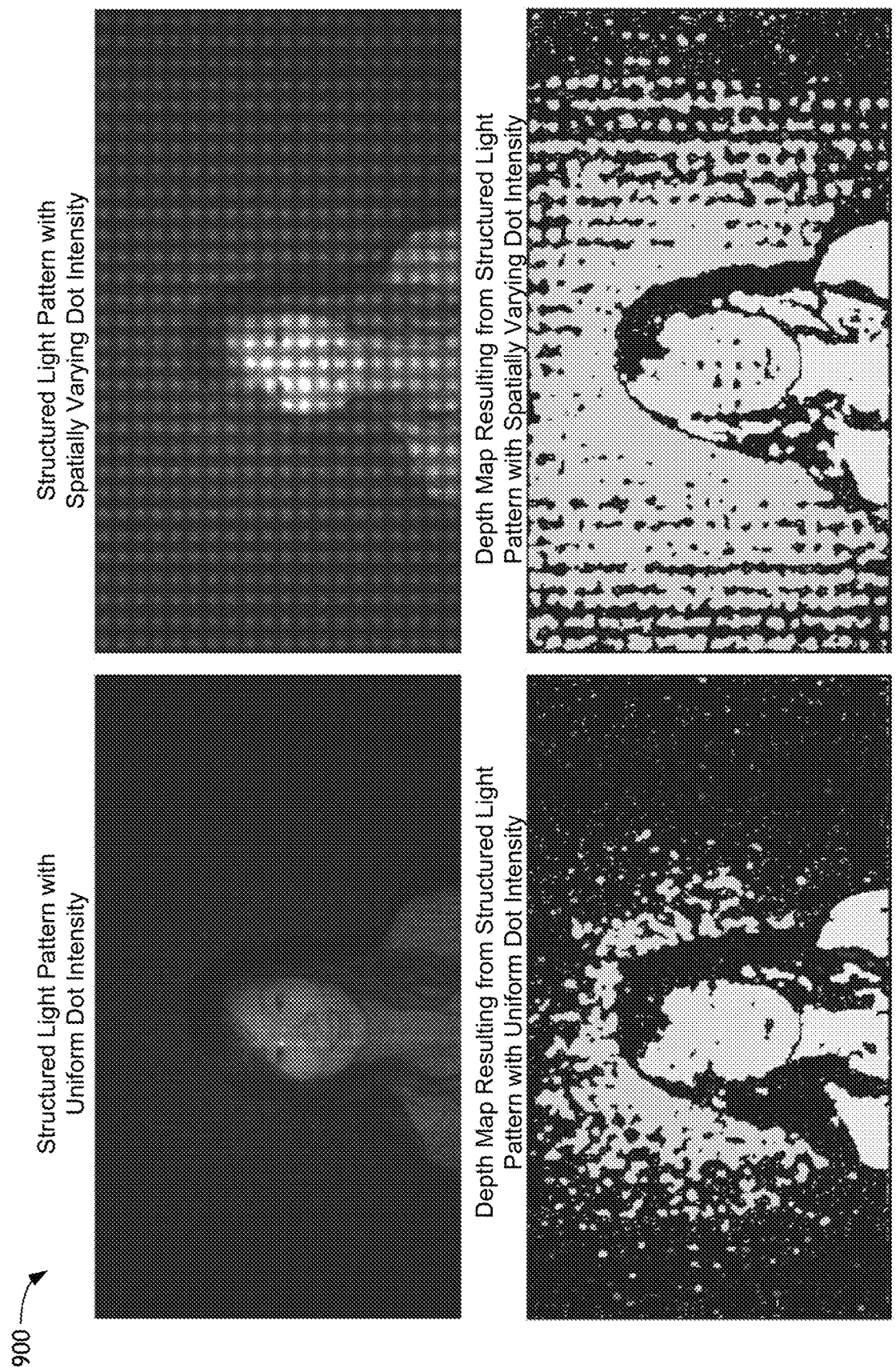
FIG. 9 illustrates a comparison between a depth map resulting from a structured light pattern with uniform dot intensity and a depth map resulting from a structured light pattern with spatially varying dot intensity, in accordance with one or more embodiments.

FIG. 9 illustrates a comparison 900 between a depth map resulting from a structured light pattern with uniform dot intensity (e.g., the structured light pattern with uniform dot intensity 510 described in connection with FIG. 5) and a depth map resulting from a structured light pattern with spatially varying dot intensity (e.g., the structured light pattern with spatially varying dot intensity 610 described in connection with FIG. 6), in accordance with one or more embodiments. The top-left image illustrates a structured light pattern with uniform dot intensity, as described above in connection with FIG. 5. Such light patterns results in a "depth map resulting from structured light pattern with uniform dot intensity," as illustrated by the bottom-left picture. By utilizing a hybrid pattern (e.g., "proposed pattern") as described herein (e.g., in connection with FIG. 6) and as illustrated by the simulation picture in the top-right of FIG. 8 ("structured light pattern with spatially varying dot intensity"), an improved depth map (e.g., the bottom right picture) can be generated ("depth map resulting from structured light pattern with spatially varying dot intensity"). As described herein, the top-right proposed pattern may also be referred to as a "hybrid pattern" and the bottom-right improved depth map may also be referred to as a "hybrid depth map."

As a non-limiting example, the top-right image can be a single infrared (IR) image, where at sparse locations the signal (e.g., the dot, or light point, pattern) is stronger (e.g., more intense), and is thus more robust to noise. The systems and methods described herein can enable decoding (e.g., for the generation of a depth map) the sparse pattern locations as shown in the top-right image, even when the corresponding scene locations are located at further distances than the other locations of the image (e.g., the distances of the scene decoded in the left images of FIG. 9). In this way, the systems and methods described herein enable decoding the pattern at least at two distances at the same time. That is, the systems and methods described herein can enable generating a hybrid depth map based on decoding a hybrid pattern including a plurality of light points projected at a first (lower) intensity and at a first (higher) resolution, in addition to a plurality of light points projected at a second (higher) intensity and at a second (lower) resolution. As illustrated in the top-right image of FIG. 9, the second (higher intensity) set of light points of the hybrid pattern can be arranged in a plurality of groups distributed across the codeword pattern at a second density lower than the first density (of the single light points). The bottom-right image of FIG. 9 can represent the hybrid depth map result.

As one example, the projector 202, having projected the structured light pattern with spatially varying dot intensity 610 from the projector 202, the structured light system 100 can detect, from the scene 106, the reflection 110 of the structured light pattern with spatially varying dot intensity 610. Based on the reflection 110 detected from the scene 106, the receiver 402 can generate first and second depth map layers at first and second resolutions according to the descriptions of FIGS. 6-8 above. For example, the first depth map layer can comprise a representation of the scene 106 according to a first distance, and the second depth map layer can comprise a representation of the scene 106 according to a second distance greater than the first distance. In this example, the hybrid depth map can comprise a representation of the scene 106 (e.g., depth information for the scene 106) according to each of the first depth map layer (at the first distance) and the second depth map layer (at the second distance).

That is, after generating the first and second depth map layers, the structured light system 100 can then generate a depth map of the scene 106 that includes both high-resolution depth information at a closer distance (e.g., the first distance) and lower-resolution depth information at a further distance (e.g., the second distance). The closer distance information (e.g., the first depth map layer) can be based on the first set of light points projected at the first intensity having point disparities based on the light point distance 625 as described above in connection with FIG. 7. The further distance information (e.g., the second depth map layer) can be based on the second set of light points projected at the second intensity having point disparities based on the group peak distances as described above in connection with FIG. 7. In this way, the structured light system 100 enables high levels for all of power efficiency, depth map resolution, and depth map distance.

Figure 10:
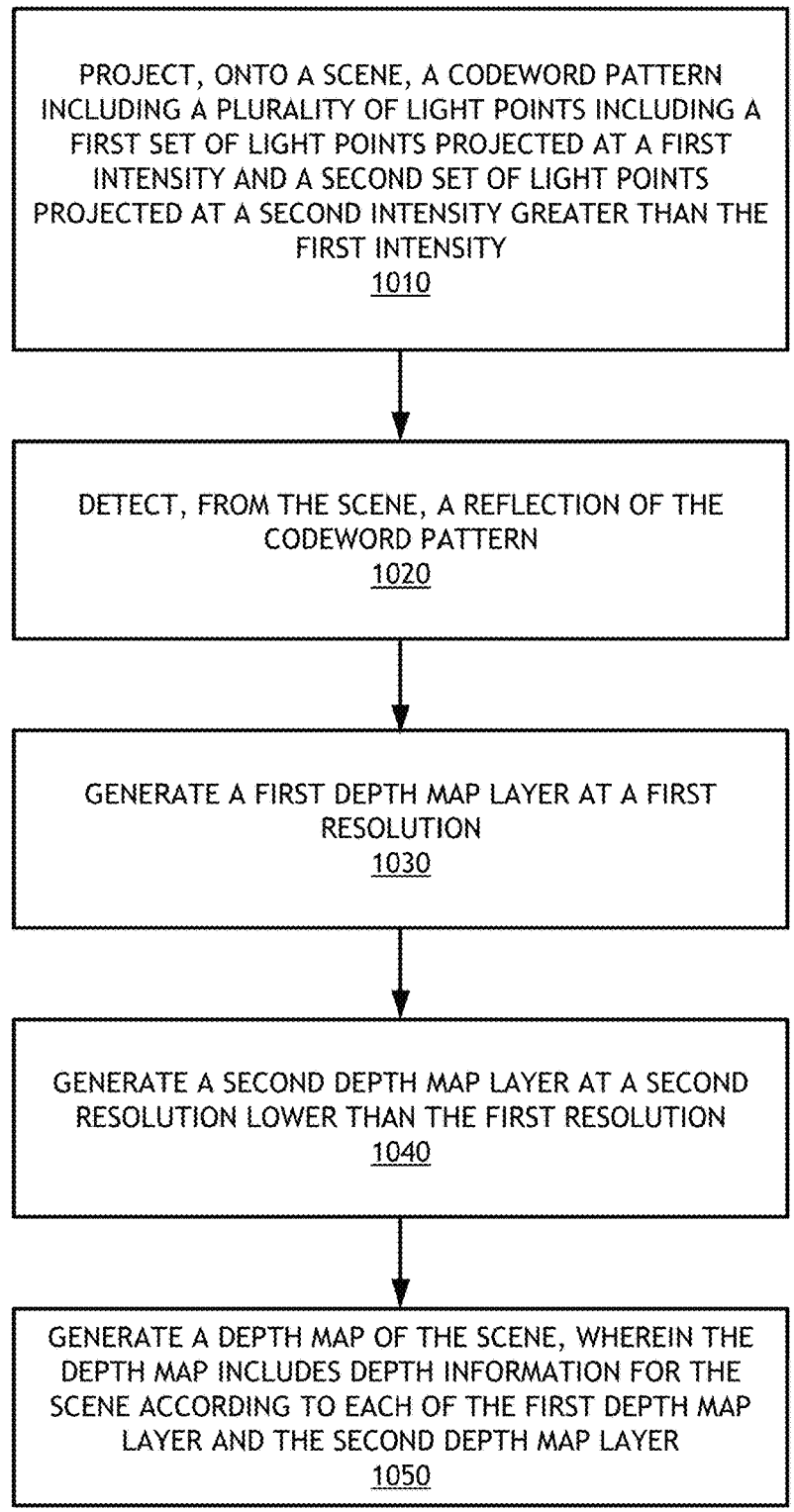
FIG. 10 is a flowchart for generating a depth map of a scene, in accordance with an exemplary embodiment.

FIG. 10 is a flowchart of a method for generating a depth map of a scene. At step 1010, the method includes projecting, onto the scene, a codeword pattern including a plurality of light points including a first set of light points projected at a first intensity and a second set of light points projected at a second intensity greater than the first intensity. At step 1020, the method includes detecting, from the scene, a reflection of the codeword pattern. At step 1030, the method includes, generating a first depth map layer at a first resolution. At step 1040, the method includes generating a second depth map layer at a second resolution lower than the first resolution. At step 1050, the method includes generating the depth map of the scene, wherein the depth map includes depth information for the scene according to each of the first depth map layer and the second depth map layer.

As used herein, the term "determining" and/or "identifying" encompass a wide variety of actions. For example, "determining" and/or "identifying" may include calculating, computing, processing, deriving, choosing, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, identifying, establishing, selecting, choosing, determining and the like. Further, a "channel width" as used herein may encompass or may also be referred to as a bandwidth in certain aspects.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

As used herein, the term interface may refer to hardware or software configured to connect two or more devices together. For example, an interface may be a part of a processor or a bus and may be configured to allow communication of information or data between the devices. The interface may be integrated into a chip or other device. For example, in some embodiments, an interface may comprise a receiver configured to receive information or communications from a device at another device. The interface (e.g., of a processor or a bus) may receive information or data processed by a front end or another device or may process information received. In some embodiments, an interface may comprise a transmitter configured to transmit or communicate information or data to another device. Thus, the interface may transmit information or data or may prepare information or data for outputting for transmission (e.g., via a bus).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) signal or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-ray® disc where disks usually reproduce data magnetically, while discs reproduce data optically with lasers. Thus, in some aspects, computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a structured light system 100, a projector 102, a receiver 108, and/or another device as applicable. For example, such a device can be coupled to a server to facilitate the transfer of means for performing the methods described herein. In some aspects, the means for projecting may comprise the projector 102, the projector 202, the projector 302, the image projecting device 308, etc. In some aspects, the means for detecting may comprise the receiver 108, the receiver 208, the receiver 402, the receiver sensor 408, the processing circuit 404, etc. In some aspects, the means for generating may comprise the receiver 108, the receiver 208, the receiver 402, the processing circuit 404, the memory/storage device 406, etc. In some aspects, the means for determining may comprise the receiver 108, the receiver 208, the receiver 402, the processing circuit 404, etc.

Alternatively, various methods described herein can be provided via storage means (e.g., RAM, ROM, a physical storage medium such as a compact disc (CD) or floppy disk, etc.), such that a structured light system 100, a projector 102, a receiver 108, and/or another device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for generating a depth map of a scene, comprising:
    projecting, onto the scene, a single codeword pattern including a plurality of light points including a first set of light points projected at a first intensity and a second set of light points projected at a second intensity greater than the first intensity;
    detecting, from the scene, a reflection of the codeword pattern;
    generating a first depth map layer at a first resolution based on the reflection;
    generating a second depth map layer at a second resolution lower than the first resolution based on the same reflection; and
    generating the depth map of the scene, wherein the depth map includes depth information for the scene according to each of the first depth map layer and the second depth map layer.

2. The method of claim 1, wherein projecting the codeword pattern onto the scene comprises transmitting the codeword pattern from a projector, and wherein:
    the first depth map layer comprises a representation of the scene according to a first distance based on projecting the first set of light points at the first intensity; and
    the second depth map layer comprises a representation of the scene according to a second distance based on projecting the second set of light points at the second intensity.

3. The method of claim 2, wherein the second set of light points is arranged in a plurality of groups that each include a peak intensity location, the method further comprising:
    determining one or more light point distances between locations of one or more light points of the first and second sets of light points in the projected codeword pattern and locations of corresponding light points in the reflection of the codeword pattern, wherein generating the first depth map layer further comprises generating the first depth map layer based on the determined light point distances; and
    determining one or more group peak distances between peak intensity locations of one or more of the plurality of groups in the projected codeword pattern and corresponding peak intensity locations in the reflection of the codeword pattern, wherein generating the second depth map layer further comprises generating the second depth map layer based on the determined group peak distances.

4. The method of claim 3, wherein the plurality of light points includes a third set of light points projected at a third intensity greater than the second intensity, the method further comprising:
  determining one or more additional distances based on locations of the third set of light points in the projected codeword pattern and in the reflection of the codeword pattern; and
  based on the determined additional distances, generating a third depth map layer at a third resolution, and
  wherein the depth map includes depth information for the scene according to each of the first, second, and third depth map layers.

5. The method of claim 3, wherein:
  the projector is located at a first position, and wherein projecting the codeword pattern onto the scene comprises transmitting the codeword pattern from the projector;
  the receiver is located at a second position, and wherein detecting the reflection of the codeword pattern comprises receiving the projected codeword pattern at the receiver;
  the one or more light point distances and the one or more group peak distances are resultants of a difference between the first position and the second position; and
  generating the first and second depth map layers comprises generating the first and second depth map layers based on triangulating codeword positions according to the one or more light point distances and the one or more group peak distances.

6. The method of claim 1, wherein detecting the reflection of the codeword pattern from the scene comprises sensing the reflected codeword pattern at a receiver, wherein the sensing includes:
  detecting the first set of light points at a first distance from the receiver based on projecting the first set of light points at the first intensity; and
  detecting the second set of light points at a second distance from the receiver based on projecting the second set of light points at the second intensity.

7. The method of claim 1, wherein projecting the codeword pattern onto the scene comprises transmitting the codeword pattern from a projector electrically coupled to a structured light module, and wherein the projected codeword pattern corresponds to a fixed mask pattern stored at the projector.

8. The method of claim 1, wherein projecting the codeword pattern onto the scene comprises transmitting the codeword pattern from a projector, and wherein:
  the codeword pattern comprises a total number of light points;
  a number of light points included in the first set of light points is equal to a first value;
  a number of light points included in the second set of light points is equal to a second value;
  a sum of the first value and the second value is equal to the total number of light points; and
  each of the light points included in the first and second sets of light points are projected from the projector simultaneously.

9. An apparatus for generating a depth map of a scene, the apparatus comprising:
  a projector configured to project, onto the scene, a single codeword pattern including a plurality of light points including a first set of light points projected at a first intensity and a second set of light points projected at a second intensity greater than the first intensity;
  a receiver configured to detect, from the scene, a reflection of the codeword pattern; and
  a processor configured to:
    generate a first depth map layer at a first resolution based on the reflection;
    generate a second depth map layer at a second resolution lower than the first resolution based on the same reflection; and
    generate the depth map of the scene, wherein the depth map includes depth information for the scene according to each of the first depth map layer and the second depth map layer.

10. The apparatus of claim 9, wherein to project the codeword pattern onto the scene the projector is configured to transmit the codeword pattern, and wherein:
  the first depth map layer comprises a representation of the scene according to a first distance based on projecting the first set of light points at the first intensity; and
  the second depth map layer comprises a representation of the scene according to a second distance based on projecting the second set of light points at the second intensity.

11. The apparatus of claim 10, wherein the second set of light points is arranged in a plurality of groups that each include a peak intensity location, and the processor is further configured to:
  determine one or more light point distances between locations of one or more light points of the first and second sets of light points in the projected codeword pattern and locations of corresponding light points in the reflection of the codeword pattern, wherein to generate the first depth map layer, the processor is configured to generate the first depth map layer based on the determined light point distances; and
  determine one or more group peak distances between peak intensity locations of one or more of the plurality of groups in the projected codeword pattern and corresponding peak intensity locations in the reflection of the codeword pattern, wherein to generate the second depth map layer, the processor is configured to generate the second depth map layer based on the determined group peak distances.

12. The apparatus of claim 11, wherein the plurality of light points includes a third set of light points projected at a third intensity greater than the second intensity, and wherein the processor is further configured to:
  determine one or more additional distances based on locations of the third set of light points in the projected codeword pattern and in the reflection of the codeword pattern; and
  based on the determined additional distances, generate a third depth map layer at a third resolution,
  wherein the depth map includes depth information for the scene according to each of the first, second, and third depth map layers.

13. The apparatus of claim 11, wherein:
  the projector is located at a first position, and wherein to project the codeword pattern onto the scene, the projector is configured to transmit the codeword pattern;
  the receiver is located at a second position, and wherein to detect the reflection of the codeword pattern, the receiver is configured to receive the projected codeword pattern;
  the one or more light point distances and the one or more group peak distances are resultants of a difference between the first position and the second position; and to generate the first and second depth map layers, the processor is configured to generate the first and second depth map layers based on triangulating codeword positions according to the one or more light point distances and the one or more group peak distances.

14. The apparatus of claim 9, wherein to detect the reflection of the codeword pattern from the scene, the receiver is configured to sense the reflected codeword pattern, and wherein to sense the reflected codeword pattern, the receiver is configured to:
   detect the first set of light points at a first distance from the receiver based on projecting the first set of light points at the first intensity; and
   detect the second set of light points at a second distance from the receiver based on projecting the second set of light points at the second intensity.

15. The apparatus of claim 9, wherein the projector is electrically coupled to a structured light module, and wherein the projected codeword pattern corresponds to a fixed mask pattern stored at the projector.

16. The apparatus of claim 9, wherein to project the codeword pattern onto the scene, the projector is configured to transmit the codeword pattern, and wherein:
   the codeword pattern comprises a total number of light points;
   a number of light points included in the first set of light points is equal to a first value;
   a number of light points included in the second set of light points is equal to a second value;
   a sum of the first value and the second value is equal to the total number of light points; and
   each of the light points included in the first and second sets of light points are projected from the projector simultaneously.

17. An apparatus for generating a depth map of a scene, the apparatus comprising:
   means for projecting, onto the scene, a single codeword pattern including a plurality of light points including a first set of light points projected at a first intensity and a second set of light points projected at a second intensity greater than the first intensity;
   means for detecting, from the scene, a reflection of the codeword pattern; and
   means for generating a first depth map layer at a first resolution based on the reflection, wherein the means for generating further generates a second depth map layer at a second resolution lower than the first resolution based on the same reflection, wherein the means for generating further generates the depth map of the scene, and wherein the depth map includes depth information for the scene according to each of the first depth map layer and the second depth map layer.

18. The apparatus of claim 17, wherein the means for projecting the codeword pattern onto the scene comprises means for transmitting the codeword pattern from the means for projecting, and wherein:
   the first depth map layer comprises a representation of the scene according to a first distance based on projecting the first set of light points at the first intensity; and
   the second depth map layer comprises a representation of the scene according to a second distance based on projecting the second set of light points at the second intensity.

19. The apparatus of claim 18, wherein the second set of light points is arranged in a plurality of groups that each include a peak intensity location, and the means for generating further comprises:
   means for determining one or more light point distances between locations of one or more light points of the first and second sets of light points in the projected codeword pattern and locations of corresponding light points in the reflection of the codeword pattern, wherein the means for generating the first depth map layer comprises means for generating the first depth map layer based on the determined light point distances; and
   means for determining one or more group peak distances between peak intensity locations of one or more of the plurality of groups in the projected codeword pattern and corresponding peak intensity locations in the reflection of the codeword pattern, wherein the means for generating the second depth map layer comprises means for generating the second depth map layer based on the determined group peak distances.

20. The apparatus of claim 19, wherein the plurality of light points includes a third set of light points projected at a third intensity greater than the second intensity, and wherein the means for generating comprises:
   means for determining one or more additional distances based on locations of the third set of light points in the projected codeword pattern and in the reflection of the codeword pattern; and
   means for generating a third depth map layer at a third resolution based on the determined additional distances,
   wherein the depth map includes depth information for the scene according to each of the first, second, and third depth map layers.

21. The apparatus of claim 19, wherein:
   the means for projecting is located at a first position, and the means for projecting the codeword pattern onto the scene comprises means for transmitting the codeword pattern;
   the means for detecting is located at a second position, and the means for detecting the reflection of the codeword pattern comprises means for receiving the projected codeword pattern;
   the one or more light point distances and the one or more group peak distances are resultants of a difference between the first position and the second position; and
   the means for generating the first and second depth map layers comprises means for generating the first and second depth map layers based on triangulating codeword positions according to the one or more light point distances and the one or more group peak distances.

22. The apparatus of claim 17, wherein the means for detecting the reflection of the codeword pattern from the scene comprises means for sensing the reflected codeword pattern, wherein the means for sensing includes:
   means for detecting the first set of light points at a first distance based on projecting the first set of light points at the first intensity; and
   means for detecting the second set of light points at a second distance based on projecting the second set of light points at the second intensity.

23. The apparatus of claim 17, wherein the means for projecting comprises a projector electrically coupled to a structured light module, and wherein the means for projecting the codeword pattern onto the scene comprises means for transmitting the codeword pattern, and wherein the projected codeword pattern corresponds to a fixed mask pattern stored at the projector.

24. The apparatus of claim 17, wherein the means for projecting the codeword pattern onto the scene comprises means for transmitting the codeword pattern, and wherein:
the codeword pattern comprises a total number of light points;
a number of light points included in the first set of light points is equal to a first value;
a number of light points included in the second set of light points is equal to a second value;
a sum of the first value and the second value is equal to the total number of light points; and
each of the light points included in the first and second sets of light points are projected from the means for projecting simultaneously.

25. A non-transitory computer-readable medium comprising code that, when executed, causes a processor of an apparatus to:
project, onto a scene, a single codeword pattern including a plurality of light points including a first set of light points projected at a first intensity and a second set of light points projected at a second intensity greater than the first intensity;
detect, from the scene, a reflection of the codeword pattern;
generate a first depth map layer at a first resolution based on the reflection;
generate a second depth map layer at a second resolution lower than the first resolution based on the same reflection; and
generate a depth map of the scene, wherein the depth map includes depth information for the scene according to each of the first depth map layer and the second depth map layer.

26. The medium of claim 25, wherein the code that causes the processor to project the codeword pattern onto the scene comprises code that causes the processor to transmit the codeword pattern from a projector, and wherein:
the first depth map layer comprises a representation of the scene according to a first distance based on projecting the first set of light points at the first intensity;
the second depth map layer comprises a representation of the scene according to a second distance based on projecting the second set of light points at the second intensity; and
the depth map comprises a representation of the scene according to both the first and second distances.

27. The medium of claim 26, wherein the second set of light points is arranged in a plurality of groups that each include a peak intensity location, and wherein the code, when executed, further causes the processor of the apparatus to:
determine one or more light point distances between locations of one or more light points of the first and second sets of light points in the projected codeword pattern and locations of corresponding light points in the reflection of the codeword pattern, wherein generating the first depth map layer is further based on the determined light point distances; and
determine one or more group peak distances between peak intensity locations of one or more of the plurality of groups in the projected codeword pattern and corresponding peak intensity locations in the reflection of the codeword pattern, wherein generating the second depth map layer is further based on the determined group peak distances.

28. The medium of claim 27, wherein the plurality of light points includes a third set of light points projected at a third intensity greater than the second intensity, and wherein the code, when executed, further causes the processor of the apparatus to:
determine one or more additional distances based on locations of the third set of light points in the projected codeword pattern and in the reflection of the codeword pattern; and
based on the determined additional distances, generate a third depth map layer at a third resolution,
wherein the depth map includes depth information for the scene according to each of the first, second, and third depth map layers.

* * * * *